US012632568B2

(12) United States Patent
Rajashekar et al.

(10) Patent No.: US 12,632,568 B2
(45) Date of Patent: May 19, 2026

(54) NETWORK SECURITY BASED ON VENDOR NETWORK SCORING WITH DYNAMIC NETWORK SEGMENTATION

(71) Applicant: International Business Machines Corporation, Armonk, NY (US)

(72) Inventors: Santosh Rajashekar, Bangalore (IN); Selvi John, Bangalore (IN); Mukundan Sundararajan, Bangalore (IN); Anita Duggal, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 18/928,127

(22) Filed: Oct. 27, 2024

(65) Prior Publication Data

US 2026/0119672 A1     Apr. 30, 2026

(51) Int. Cl.
G06F 21/57          (2013.01)
G06F 21/56          (2013.01)
(Continued)

(52) U.S. Cl.
CPC ............ G06F 21/577 (2013.01); G06F 21/56 (2013.01); H04L 41/16 (2013.01);
(Continued)

(58) Field of Classification Search
CPC . H04L 63/14; H04L 63/1433; H04L 63/1416; H04L 63/1408; H04L 63/1441;
(Continued)

(56) References Cited

U.S. PATENT DOCUMENTS 7,096,502 B1    8/2006  Fox et al.
11,496,323 B1   11/2022  Caceres et al.
(Continued)

FOREIGN PATENT DOCUMENTS

CN        113361933 A      9/2021
CN        118138295 A      6/2024
(Continued)

OTHER PUBLICATIONS

"Security Automation: Tools, Process and Best Practices", Cynet, retrieved from web https://www.cynet.com/incident-response/security-automation-tools-process-and-best-practices/, Apr. 2021, 15 pages.
(Continued)

*Primary Examiner* — Shaqueal D Wade-Wright
(74) *Attorney, Agent, or Firm* — CANTOR COLBURN LLP; Anthony Mauricio Pallone

(57)                    ABSTRACT

Mechanisms are provided for decentralized security orchestration. The mechanisms execute training, for each vendor network in the plurality of vendor networks, on a corresponding vendor network artificial intelligence (AI) computer model. The training is executed with training data collected from a corresponding vendor network over time, where the training data represents transactions occurring within the corresponding vendor network. The trained models are executed on new security information to thereby classify activity in portions of the data processing system as to a security risk level. Fuzzy logic is executed on the classifications to automatically determine if segmentation of the data processing system is to be performed. If segmentation is to be performed, the mechanisms segment/isolate portions having a predetermined security risk level classification.

20 Claims, 4 Drawing Sheets

(51) Int. Cl.

| | | |
|---|---|---|
| *H04L 9/40* | (2022.01) | |
| *H04L 41/16* | (2022.01) | |
| *G06F 21/50* | (2013.01) | |
| *G06F 21/55* | (2013.01) | |

(52) U.S. Cl.
CPC ...... *H04L 63/0421* (2013.01); *H04L 63/1433* (2013.01); *G06F 21/50* (2013.01); *G06F 21/55* (2013.01); *H04L 63/1416* (2013.01); *H04L 63/1441* (2013.01)

(58) Field of Classification Search
CPC ......... H04L 41/16; G06F 21/50; G06F 21/55; G06F 21/56; G06F 21/57; G06F 21/552; G06F 21/562; G06F 21/566; G06F 21/577
See application file for complete search history.

(56) References Cited

U.S. PATENT DOCUMENTS

| | | | |
|---|---|---|---|
| 2018/0322419 A1 | 11/2018 | Bugenhagen | |
| 2019/0260786 A1* | 8/2019 | Dunn | H04L 63/1441 |
| 2021/0034423 A1 | 2/2021 | Hallur et al. | |
| 2021/0200814 A1 | 7/2021 | Tal et al. | |
| 2022/0318068 A1* | 10/2022 | Shilawat | G06Q 50/60 |
| 2024/0104652 A1* | 3/2024 | Sabharwal | G06Q 40/04 |
| 2024/0283611 A1 | 8/2024 | Niu et al. | |
| 2025/0156804 A1* | 5/2025 | Williams | G06Q 10/087 |
| 2026/0046226 A1* | 2/2026 | Maria | H04L 43/026 |

FOREIGN PATENT DOCUMENTS

| | | |
|---|---|---|
| CN | 118170010 A | 6/2024 |
| IN | 202411012801 A | 3/2024 |
| JP | 2020-181294 A | 11/2020 |
| TW | 550913 B | 9/2003 |
| WO | 2020/075270 A1 | 4/2020 |

OTHER PUBLICATIONS

Levonevskiy et al. "Network attacks detection using fuzzy logic", IEEE, 2015 XVIII International Conference on Soft Computing and Measurements (SCM), May 2015, 2 pages.
Shanmugavadivu R. "Network Intrusion Detection System Using Fuzzy Logic", Indian Journal of Computer Science and Engineering, Feb. 2011, pp. 101-111, vol. 2 No. 1.
Smeriga et al. "Behavior-Aware Network Segmentation using IP Flows", Canterbury, United Kingdom, Aug. 26-29, 2019, 9 pages.
Stephan et al. "Fuzzy-Logic-Inspired Zone-Based Clustering Algorithm for Wireless Sensor Networks", International Journal of Fuzzy Systems, Sep. 2020, pp. 506-517, vol. 23.
Zhao et al. "Dynamic routing, modulation, and spectrum assignment based on fuzzy logic control in elastic optical networks", Applied Optics, Jan. 2022, 1 page, vol. 61, Issue 1, doi: 10.1364/AO.443445. PMID: 35200822.
Zrahia Aviram. "Threat intelligence sharing between cybersecurity vendors: Network, dyadic, and agent views", Journal of Cybersecurity, 2018, pp. 1-16, doi: 10.1093/cybsec/tyy008.
International Searching Authority, "Notification of Transmittal of the International Search Report and the Written Opinion of the International Searching Authority, or Declaration," Patent Cooperation Treaty Feb. 25, 2026, 08 pages, International Application No. PCT/IB2025/059827.

* cited by examiner

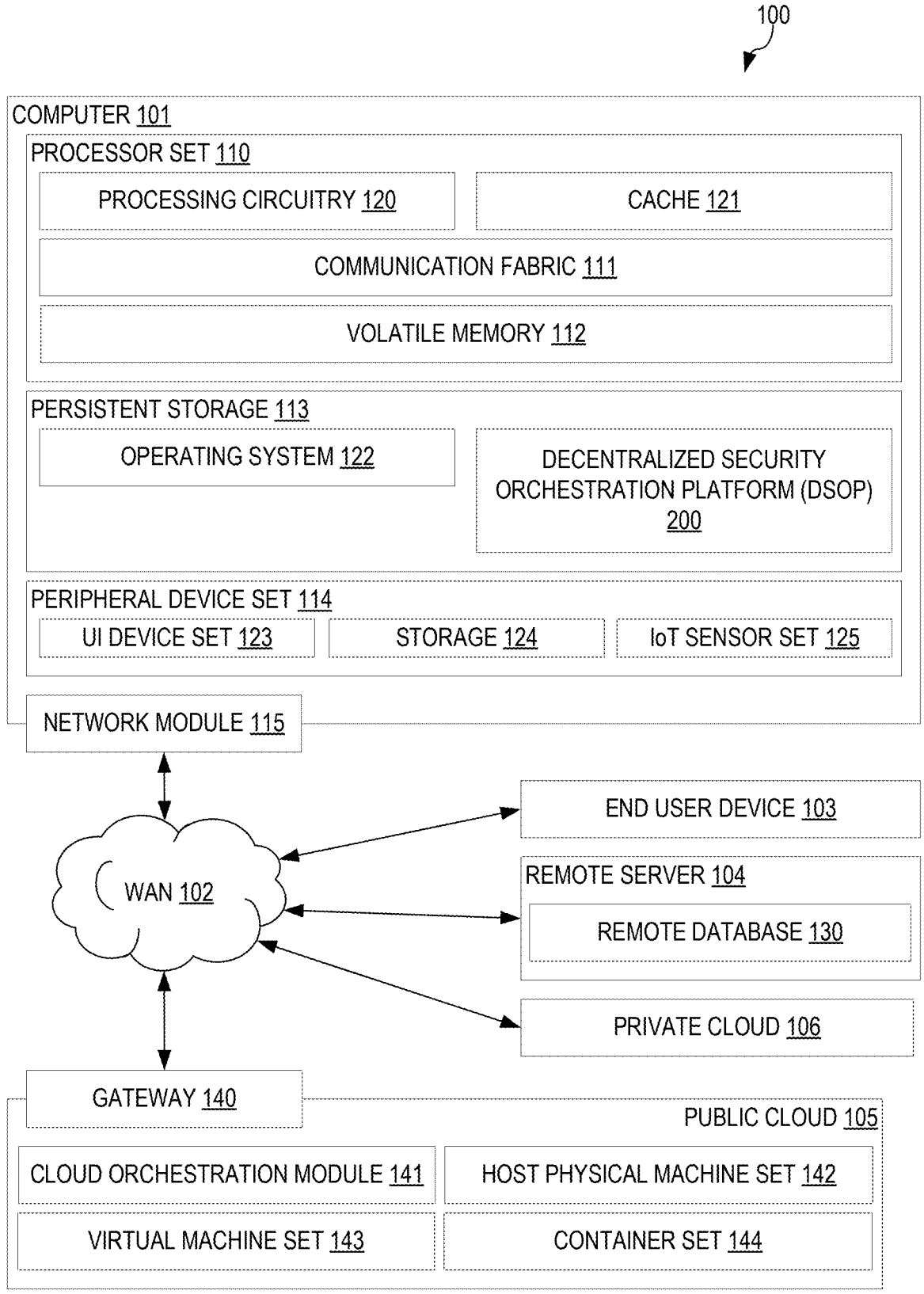

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122    DECENTRALIZED SECURITY ORCHESTRATION PLATFORM (DSOP) 200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

*FIG. 1*

NETWORK SECURITY BASED ON VENDOR NETWORK SCORING WITH DYNAMIC NETWORK SEGMENTATION

BACKGROUND

The present application relates generally to a data processing apparatus and method, and more specifically to a computing tool and computing tool operations/functionality for providing network security based on vendor network scoring with dynamic network segmentation.

In an open network environment, where there are multiple vendor stacks (i.e., sets of vendor provided software/hardware tools and technology (components) used to provide a computer service or infrastructure), security vulnerabilities and potential risks emerge, increasing the likelihood of unauthorized access and system compromise. The interconnected nature of multiple vendors'components makes the system more susceptible to attacks, where compromising one portion of the enterprise network, or "block", could lead to the entire system being compromised (enterprise networks are divided into "blocks" based on geographies, business units, and the like, and network security management of a block is assigned to a corresponding vendor among multiple vendors). Thus, there is a need to implement effective security measures to prevent, detect, contain, and fix any potential security breaches.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method for decentralized security orchestration in a data processing system comprising a plurality of vendor networks. The method comprises executing machine learning training, for each vendor network in the plurality of vendor networks, on a corresponding vendor network artificial intelligence (AI) computer model to thereby generate a plurality of trained vendor network AI computer models. The machine learning training is executed with training data collected from a corresponding vendor network over time as input to the corresponding vendor network AI computer model. The training data represents transactions occurring within the corresponding vendor network. The method further comprises executing the plurality of trained vendor network AI computer models on new security information collected from the plurality of vendor networks of the data processing system, to thereby classify activity in portions of the data processing system as to a security risk level. The method also comprises executing fuzzy logic on the classifications of activity in portions of the data processing system to automatically determine whether segmentation of the data processing system is to be performed or not due to a portion of the data processing system having a predetermined security risk level classification. Furthermore, the method comprises, in response to the fuzzy logic indicating that segmentation is to be performed, automatically segmenting the data processing system to isolate the portion of the data processing system having the predetermined security risk level classification. In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

DETAILED DESCRIPTION

Figure 2:
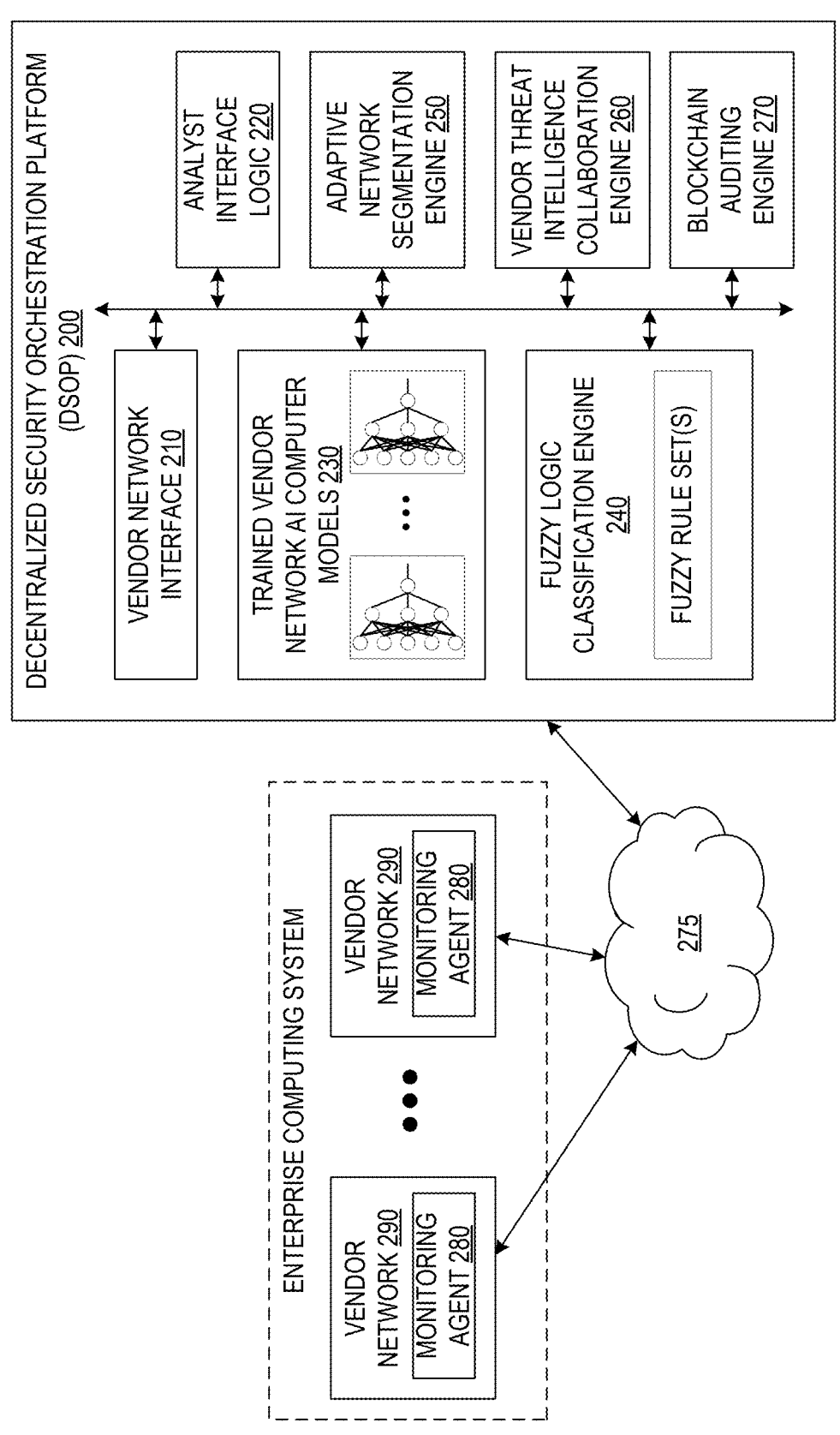
FIG. 2 is an example block diagram of a Decentralized Security Orchestration Platform (DSOP) in accordance with one illustrative embodiment.

The illustrative embodiments provide a computing tool and computing tool operations/functionality for providing network security based on vendor network scoring with dynamic network segmentation. The illustrative embodiments provide an improved computing tool and operations/functionality specifically directed to the problems arising from the computer arts with regard to security threats arising from the open network and the presence of multiple vendor stacks. The illustrative embodiments provide an improved computing tool and improved computing tool operations/functionality to mitigate vulnerabilities, reduce attack surfaces, and limit unauthorized access.

The illustrative embodiments provide mechanisms to detect security vulnerabilities or compromises in open networks having multiple vendor networks using a decentralized or distributed architecture. That is, for every network block of an enterprise network, for example, monitoring of the network block is performed separately with a vendor specific AI network monitoring system. At least two of these AI network monitoring systems may be implemented with different vendors such that there may be different vendors monitoring the security of different blocks of the enterprise network. The AI network monitoring system of a vendor comprises security hardware and software on network equipment, with each vendor performing a periodic or continuous monitoring of the network activity in their associated block(s) using corresponding AI network monitoring systems and specialist network analysts to determine threat situations and instantiation of remediation measures. New threat scenarios or indicators of compromise, when identified and remediated by a vendor specific AI network monitoring system in one block, also referred to as a "vendor network", may be transmitted or shared with AI network monitoring systems of other blocks, i.e., other vendor networks, for incorporation into continuous learning by the AI network monitoring systems of these other blocks in a multi-vendor managed enterprise network.

In addition to the detection of security vulnerabilities or compromises, the illustrative embodiments also provide mechanisms for isolating detected compromises and performing a self-healing of these compromised portions of the system. With regard to detecting compromises, the illustrative embodiments implement robust monitoring and detection mechanisms to promptly identify signs of a data processing system or computing system (or simply referred to herein as a "system") compromise or suspicious activities. This involves setting up real-time alerts, anomaly detection, and log analysis to track unusual behavior within the network.

With regard to containing compromised blocks, the illustrative embodiments implement network segmentation strategies to isolate and contain compromised blocks within the multi-vendor network environment. A segment refers to a logically isolated portion of the vendor network that can be dynamically adjusted based on security needs. This segmentation can represent, for example, end-to-end network paths between two points, sub-networks containing clusters of related nodes, vendor networks which are treated as individual segments. In some illustrative embodiments, the segments may be identified by the Internet Protocol (IP) addresses using IPV4 or IPV6 definitions, for example. A sub-network may be considered a physical or logical grouping of nodes (e.g., physical/virtual processors) within a larger network. A segment is a fluid and dynamic entity that may represent a part of a sub-network, an entire sub-network, an independent portion of a vendor network, or an entire vendor network, depending on the security needs. Segments are created and adjusted dynamically in response to security risks, whereas sub-networks may represent more static divisions. The isolation mechanism of the illustrative embodiments provide fail-safe mechanisms to prevent unauthorized lateral movement and limit the impact of a single block compromise through segmentation and isolation of affected blocks/segments.

With regard to fixing compromised blocks, the illustrative embodiments provide effective incident response and recovery plans to address compromised blocks swiftly. The illustrative embodiments create processes for isolating and analyzing compromised components, identifying the root cause of the breach, and implementing necessary fixes to restore system integrity. The illustrative embodiments provide secure communication protocols between different vendor stacks to ensure data integrity, confidentiality, and authenticity. The illustrative embodiments utilize encryption and strong authentication methods to protect sensitive information during transmission and conduct periodic security assessments and audits of the entire network and vendor stacks to proactively identify vulnerabilities and weaknesses. Moreover, the illustrative embodiments develop a plan to address the identified issues promptly and maintain continuous improvement.

In accordance with one or more illustrative embodiments, a decentralized security orchestration platform (DSOP) is provided that addresses the security challenges posed by open networks and multiple vendor stacks. The DSOP of these illustrative embodiments employs a decentralized and distributed architecture that significantly reduces the attack surface and enhances the resiliency of the entire system. The DSOP components provide for the definition of a set of fuzzy logic rules and fuzzy metrics in active network level operations, subnetwork level operations, and node level operations. The set of fuzzy logic rules and fuzzy metrics may operate on the concept of vendor network/sub-network entropy and classification of this entropy. This vendor network/sub-network entropy is a disorder measure and, in some illustrative embodiments, may be computed continuously based on a function, e.g., weighted sum or the like, of various factors including, but not limited to, one or more of session activities, suspicion level for an activity by the end-points, user privileges, privilege changes within session, volume of data, endpoints' network atomicity across all endpoints within the segment, and the like. The weights in this weighted sum may be computed using fuzzy logic rules. In general, the measured vendor network/sub-network entropy will be increasing with time, however within a specified temporal period, this entropy may change direction, which indicates disorder.

The vendor network/sub-network entropy (hereafter simply the "entropy") may be calculated and classified into various entropy bands, and this classification being used to determine when active network segmentation needs to be carried out and when sub-network topologies need to be moved to implement network isolation regions. For example, if it is observed that the network/sub-network entropy of a portion of a system is constant or decreasing over time, this can be taken as an indicator that there is a potential security vulnerability and automated active network segmentation may be performed to isolate corresponding segments of the system, thereby decreasing the likelihood that any such security vulnerability or security breach can spread to other components, such as other components of the same or different vendor stacks.

With the DSOP mechanism of the illustrative embodiments, security vendors can have a machine and human inputs driven joint assessment of network threat based on the network/sub-network/node entropy to determine active isolation through segmentation. Network security involving multiple vendor networks can be constantly monitored in an automatic or semi-autonomous manner, thus providing for human subject matter expert (SME) involvement only at points of interest and time slices of interest while at other points automated processes handle the security of the system automatically. For example, a SME may be notified of areas of the network that may be potential security risks and the SME may provide input via one or more user interfaces, e.g., see FIG. 4 and the description hereafter, to specify the SME's evaluation of the security risk, such as via a user interface element, e.g., slider bar or the like.

In one or more illustrative embodiments, the DSOP mechanisms utilize blockchain technology to establish a secure and tamper-proof identity and access management system. Each network component, including vendor stacks, is assigned a unique and immutable identity on the blockchain. Access controls and permissions are cryptographically enforced, preventing unauthorized access and potential privilege escalations. The blockchain mechanisms are used to increase transparency among the transactions within and across blocks of the enterprise network. This blockchain technology enables identification of the end-points involved in security incidents and in determination of chronology and sequence. Security incidents can involve rapid changes to remote endpoint addresses that may not be uncovered, but for the information contained in the blockchain which records these changes in the blocks. It should be appreciated that blockchain is only used as an example and any other immutable data structure mechanisms may be used without departing from the spirit and scope of the present invention.

The DSOP mechanisms implement adaptive network segmentation, where the system automatically adjusts the level of segmentation based on real-time threat intelligence and network activity, such as by assigning new network addresses to the endpoints in the segment or to individual end-points. If suspicious behavior or anomalies are detected, DSOP dynamically isolates the affected components from the rest of the network, containing potential threats swiftly. The adaptive network segmentation uses fuzzy logic to auto-generate the decision if segmentation is to be carried out. The auto generation of such decisions reduces delays in the network segmentation and reconfiguration to isolate the impacted systems, but still provides service at low latency, i.e., perceptible but not user impacting. The factors driving the logic include factors for determining a level of suspicion of the connection between two endpoints, e.g., source and target applications across machines in a network, involved in an information exchange. These factors may include, for example, payload type, remote endpoint characteristics, frequency of usage, a level of authorization, and/or the like, in a session, during the course of a transaction, or other interaction between the endpoints and/or between an end-point and a user.

The fuzzy rule set is determined by the enterprise for each vendor network. As the analysts are watching the network via one or more user interfaces that provide real-time data based monitoring, and see transactions from an internal endpoint (or between two internal endpoints) that seem to raise a level of suspicion, they may mark the point on a slider based on their personal knowledge and expertise as to suspicion activities (see FIG. 4 described hereafter). The system automatically calculates the other factors such as payloads, frequency, role privileges, etc., and computes the entropy of each vendor network as the sum or sigmoid function (if the entropy is computed by the monitoring AI system) to determine if the entropy is temporally increasing over similar periods, where these period lengths may be defined for various session types identified when the initial vendor set-up is done in DSOP, e.g., a temporal period may be specified as a session between an endpoint and an enterprise ERP system being live/active for 300 seconds or between an endpoint and an access management system being 2 seconds. If the entropy is constant or decreasing, this can be taken as the signal to isolate and create isolated segments.

In one or more illustrative embodiments, the DSOP mechanisms leverage artificial intelligence (AI) and machine learning computer models to analyze network traffic, device behavior, and user activities continuously. This AI-driven approach enables DSOP to detect and respond to emerging threats rapidly, even those that may have not been previously identified. When a new vendor network is to be added to the system, the traffic, devices and user activities, are measured, if not already available, for a period of time to build a training data set. The training data set is used to train a machine learning computer model for the new vendor network to classify input features as to whether the features represent normal or abnormal operations of the vendor network, and thereby identify potential threats when the operation appears to be abnormal. A second machine learning computer model is provided that operates on input features from different vendor networks to look for patterns and compute likely anomalies in the combination of vendor networks. The second machine learning computer model may take inputs from the outputs of the various trained vendor network machine learning computer models for all of the vendor networks involved in the system or a designated portion of the system, such as in an ensemble type approach, to thereby generate a final prediction or classification of whether the system or portion of the system is likely the target of a security threat or poses a threat vulnerability.

The DSOP mechanisms foster collaboration among different vendor stacks by facilitating a secure and anonymized threat intelligence sharing mechanism. Vendors can share insights into the latest threats and vulnerabilities without revealing proprietary information, allowing the entire ecosystem to benefit from collective security knowledge. The DSOP mechanisms integrate automated incident response capabilities that trigger immediate actions upon detecting security incidents such as malware or DDOS attacks, likely trojans, identified ransomware, and the like, using existing point solutions and immediately isolating or creating new network segments by new address assignment. The platform can autonomously quarantine compromised blocks, initiate forensic investigations, and apply predefined remediation steps, reducing response time and minimizing potential human error. That is, when a security incident is identified, the illustrative embodiments can swiftly isolate the endpoints through segmentation and isolation, such as by implementing new address assignments, which exposes very little of the internal network, and can trigger queries to the blockchain for the information of the session and the involved endpoints.

The DSOP mechanisms implement a self-healing architecture where compromised components are automatically quarantined and restored to a known secure state. That is, for example, when a security incident occurs, there are several network components involved within the enterprise network, such as core/edge switches, routers, bridges and firewalls, etc. that are in a compromised state. The security incident originator has awareness of the full path within an enterprise network that can be exploited to accesses other systems or applications. The prior secure state of network/sub-network segments may be used as a base, and the network topology may be modified at the sub-network level, such as by increasing or decreasing the endpoints in each sub-network, while maintaining the overall network state. The devices with compromised identities (network addresses) may be reconfigured with new addresses and device identities so that the exposed identity information of such devices is removed.

The DSOP mechanisms follow a zero-trust model, continuously verifying the authenticity and security posture of every network entity before granting access. For example, endpoints within the enterprise network may be authenticated prior to being given access to the enterprise network. External endpoints involved in a session, however, may require authentication as to whether the information exchange is secure, the endpoints/URLs are not blacklisted or suspicious, authenticating whether confidential information is being sent, or the like, with regard to each session and/or transaction.

Security audits on DSOP mechanisms are conducted through blockchain-based smart contracts, generating immutable records of all security-related activities. These transparent audits enable stakeholders to validate the effectiveness of security measures and ensure compliance with industry standards. For example, security smart contracts may be used which require that all sessions are logged and remediation actions are taken when security incidents occur, there is an incident of compromise, or the network entropy shows a disorder. Flagged sessions that resulted in logging and remediation may then be analyzed for new threat events. For a given period, the blockchain data is extracted for sessions with remediation, and ones identified as having a compromise, to check if the smart contract terms have been met across different vendors. Failures which resulted in a network compromise will directly show the network segment involved.

Thus, the DSOP mechanisms of the illustrative embodiments significantly reduces the system's attack surface, preventing lateral movement and containing threats more effectively, reducing the risk of system compromise. The use of AI-driven monitoring allows for rapid detection and response to emerging threats via autonomous and continuous monitoring, bolstering the system's ability to fend off sophisticated attacks. The DSOP mechanisms foster a collaborative security ecosystem where vendors work together to improve overall security without compromising vendor proprietary information. This is achieved by sharing details of the threat and the remediation across vendors which drives the automated updating of the training data set and re-training of the AI monitoring engines so that the threat occurring in one vendor will be detected very quickly if the attack moves to another block of the enterprise. Transparent security audits through blockchain ensure accountability and instill confidence in stakeholders, regulators, and customers. This is further bolstered by the conducting of periodic security assessments and audits of the entire network and vendor stacks to proactively identify vulnerabilities and weaknesses. The DSOP mechanisms implement a self-healing architecture where compromised components are automatically quarantined and restored to a known secure state after quarantine.

In accordance with at least one illustrative embodiment, the DSOP obtains network configuration is obtained by deploying monitoring agents across various vendor networks, which continuously capture network traffic, device behaviors, and user activity. These monitoring agents act as data collectors and feed real-time to the DSOP which analyzes this data by processing connection points, payload types, transaction frequencies, user privileges, and the like, using vendor specific AI models for each vendor network whose outputs are used to dynamically adjust configurations of vendor networks dynamically based on the evolving vendor network behaviors. The monitoring agents track both internal exchanges within a network and external exchanges between different vendor networks and collect performance information is collected. For example, when two endpoints exchange data, the monitoring agents collect metadata, e.g., packet size, transaction volume, etc., which is stored and analyzed using machine learning models. the setup and different monitoring parameters of the connected flows are established.

The performance of each segment, e.g., subnet or endpoint-to-endpoint path, in the overall network, is calculated and assigned to the security specialist team(s) in the case that there is any potential security vulnerability or threat (offense) detected. A segment refers to a logically isolated portion of a network that can be dynamically adjusted based on security needs, with each segment representing one of an endpoint-to-endpoint network path between two points, sub-networks containing clusters of related nodes, or entire vendor networks which are treated as individual segments. The detection of such security vulnerabilities or threats (offenses) and the classification of such offenses may be performed using specifically trained AI (machine learning) computer models that are trained for each of the vendor networks that are part of the overall network or system. These AI computer models take the performance information as input and classify the performance into one of a plurality of potential classifications, such as normal, likely threat, indicator of compromise (IOC), malware attack-trojan, ransomware, and the like.

The performance data is obtained for each previously defined segment in each vendor network of the multi-vendor network architecture. Segments may be initially generated through a baseline network analysis of the vendor network architecture for a block of the multi-vendor network architecture. This analysis may be performed, for example, when a vendor network is first integrated into the multi-vendor network architecture. The baseline may be created by collecting historical network traffic and transaction data. Once the AI models for the vendor networks are trained on this baseline data, the DSOP can predict normal behavior for each segment and classify deviations as suspicious. Segments may then be dynamically adjusted and/or generated in response to these detected deviations. For example, if a specific group of nodes within a vendor network shows unusual activity, the DSOP of the illustrative embodiments will operate to isolate them into a new segment to mitigate potential risks.

The performance data obtained for each previously defined segment is aligned to fuzzy logic to classify whether the performance data represents normal or abnormal (suspicious) behavior. That is, fuzzy rules are applied to the performance data, which may include various types of data including, but not limited to, packet sizes, transaction frequencies, user privileges, and/or the like, to determine if this performance data does or does not correlate with the determined normal behavior of the corresponding vendor network. Fuzzy logic allows for a more subjective analysis by assigning weightings to different parameters based on their relative importance. For example, if the packet size is unusually large and the user has high privileges, but is accessing unfamiliar services, the system may classify this behavior as suspicious. The fuzzy logic evaluates these factors in real-time and provides a risk score and/or classification that helps determine whether segmentation or isolation is necessary. This allows for the DSOP to operate on degrees of suspicion rather than on a binary yes/no determination.

Some of the parameter data is collected from automated measurements on the network/sub-networks using the active nodes while some of the parameters may be provided by analysts who are live monitoring the network/sub-networks. Active nodes are network components that are currently engaged in network traffic or participating in data transactions. These nodes are actively monitored by collecting and computing performance and security metrics, such as transaction volume, user activity, and packet exchange metrics. Active nodes are prioritized in security analysis because they represent the most immediate potential sources of security information and detection of possible security breaches. The illustrative embodiments periodically or continuously monitor these active nodes for deviations from normal behavior, which could indicate a compromise or unauthorized access. For example, if a specific active node suddenly starts transmitting significantly larger packets than usual, the DSOP of the illustrative embodiments identifies this behavior as suspicious and isolates the node by placing it into a separate segment.

Non-active nodes, or those that are not currently transmitting data, are still monitored but typically represent a lower risk. If the user privilege is higher (such as reviewer or administrator) than a base user, this is susceptible to security breach and hence after a period of inactivity, the level of suspicion increases as network entropy decreases and DSOP isolates the node or node pair into a separate segment until the session activity is terminated by the user.

Figure 4:
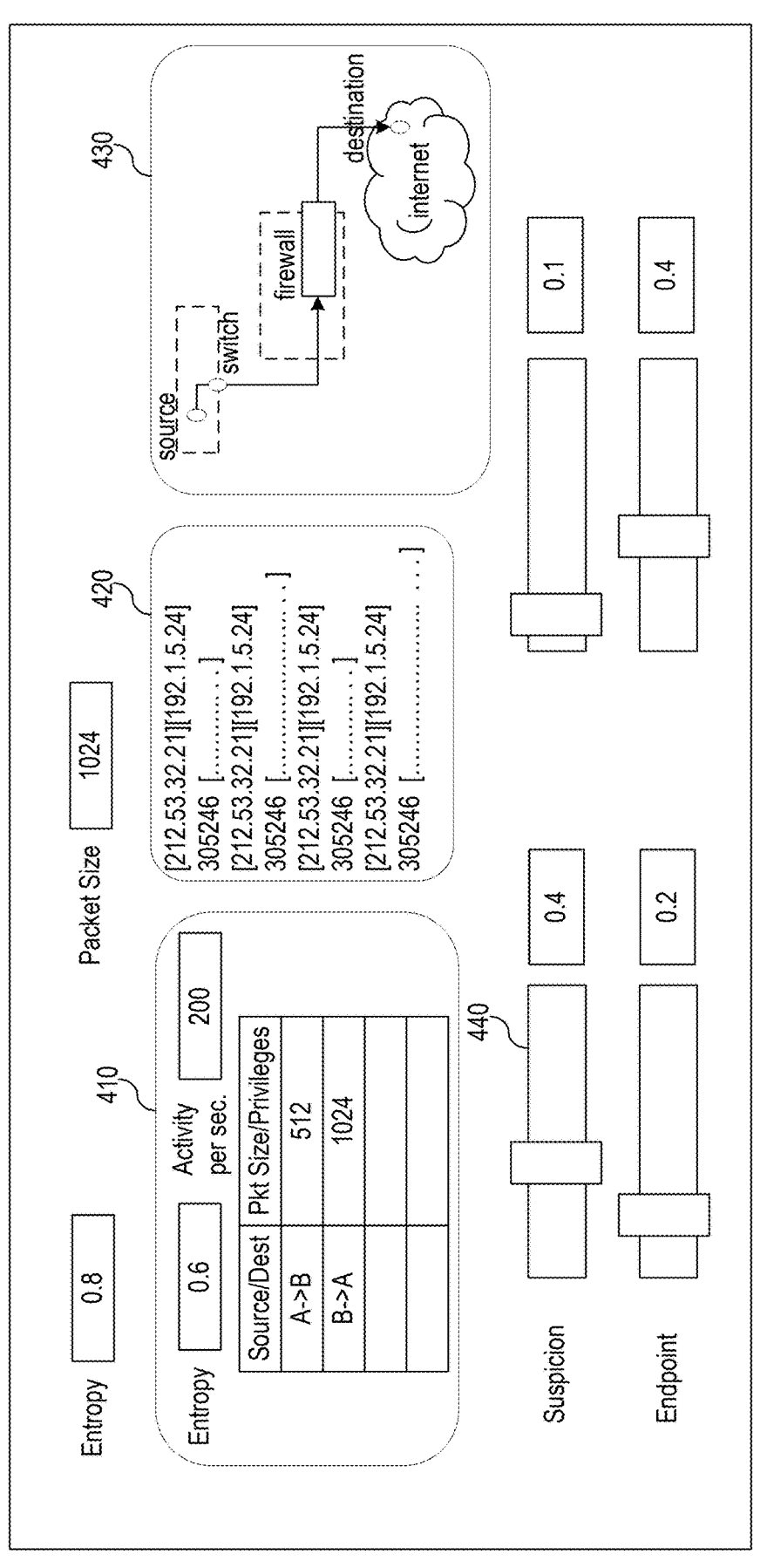
FIG. 4 is a diagram illustrating an example user interface through which users may navigate an enterprise network and specify security concerns in accordance with one illustrative embodiment.

Thus, in some embodiments, only automatically obtained parameter measurements are utilized, while in others a combination of automatically obtained parameter measurements and human provided parameters may be utilized. The human provided parameters may be obtained via one or more graphical user interfaces (GUIs) through which an analyst may provide inputs specifying the parameters and/or parameter values, for example. Various types of GUI elements may be utilized to facilitate such inputs including slider bars, click boxes, input fields, user selectable graphical elements, or the like. FIG. 4 provides one example of a GUI through which a user may provide inputs. As shown in FIG. 4, the GUI includes one or more data windows 410-430 and one or more slider bars 440. The data windows 410-430 can provide various types of performance information and other information relevant to presenting potential security concerns with regard to portions of a multi-vendor network. For example, data window 410 presents performance information for various paths in the multi-vendor network including entropy, activity, packet sizes, and user privileges. Data window 430 presents a graphical representation of the corresponding portion of the multi-vendor network. Slider bars 440 allow for a user to slide a GUI element along a continuum to thereby specify a desired level of suspicion. FIG. 4 is only an example and is not intended to be limiting on the illustrative embodiments.

The parameters, either automatically determined or human specified, are mapped against the fuzzy logic rule set to determine the classification of the operations of the network/subnetwork or segment of the system. As an example, a human analyst who may be monitoring the operation of the system may, via a GUI element, such as slider bar 440, mark a node in a graphical representation of the system, e.g., see 430 in FIG. 4, as "likely suspicious" and another node as "highly likely/susceptible" in level of suspicion. Automatically obtained parameter measurements may include packet size which may be automatically classified via the AI computer models of the illustrative embodiments to indicate that the packet sizes corresponding to these nodes have a non-usual packet size and are indicative of a "likely threat" classification. Moreover, the automatically obtained parameters of privilege level and frequency may be in the normal range, and the transaction priority level may be a not high value. These are only examples of the types of parameters that may be automatically obtained from the transactions performed in the network/subnetwork and which are indicative of the performance and operation of the segments of the network/subnetwork. Each of these parameters may be classified by the AI computer model to generate a classification for each parameter which may be utilized with fuzzy logic rules to determine a weighting for each parameters that may be combined with weightings of other parameters to determine a combined output representing an entropy and risk classification for the corresponding segment.

Thus, using the combination of weightings of the various parameters, the fuzzy logic may compute the overall class of risk and the entropy of the network, as well as compare this overall classification to one or more thresholds that indicate the severity of this risk and entropy. For example, the fuzzy logic may determine if the overall classification is lower than a temporal average of the security parameters over a predetermined period of time. This temporal average may be used to establish a baseline for normal network behavior. When the system detects deviations, such as a drop in entropy over time, it uses the temporal average as a reference point to determine whether action is necessary. For example, if network entropy drops below the temporal average, this may signify that the network is becoming more predictable and thus, potentially vulnerable. In such a case, the DSOP mechanisms of the illustrative embodiments may trigger network segmentation to mitigate the risk.

For example, in one or more illustrative embodiments, the entropy may be the summation of weightings of dynamic analysis factors such as, but not limited to, packet size, transaction frequency, and user roles and privileges. For example, with regard to packet size, unusual increases in packet size may indicate data exfiltration. With regard to transaction frequency, a high frequency of small transactions could be a sign of a botnet. With regard to user roles and privileges, elevated privileges combined with abnormal behavior raises suspicion. Each factor may be assigned a weight based on its relative potential impact on network security, with fuzzy logic rules governing how these factors are combined. The combination of these factors by the fuzzy logic determines the vendor network's entropy (disorder measure). Lower entry may indicate that the network is becoming more predictable or compromised, prompting the DSOP mechanisms of the illustrative embodiments to isolate certain segments.

Thus, based on results of applying the fuzzy logic to the weightings of the parameters, it may be determined that the entropy of the system continues to drop over time, indicating a potential security vulnerability, as security systems are designed to have high entropy to ensure security of the system. If the entropy of a subnetwork or segment continues to decrease, this indicates that the specific nodes of that subnetwork or segment need to be moved to an isolated sub-net while monitoring further in order to contain any potential threat and prevent the threat from spreading to other vendor networks in the system. In such a case, the software defined network automatically kicks in and moves the node(s) to a new subnet. If all the segments are within the safe operation band, i.e., a predefined threshold of acceptable network behavior based on entropy levels and risk classifications, the mechanisms continue collection of security related information and continued assessments are carried out on the information. The safe operation band is a range within which the system operates security such that if network behavior remains in this band, no action is required. However, if parameters, e.g., entropy or traffic anomalies, move outside of this band, the DSOP mechanisms of the illustrative embodiments trigger automated actions, such as segmentation and/or isolation, to mitigate potential threats. For example, if a vendor network's entropy drops below the lower limit of this safe operation band, the DSOP will flag this as a security risk and automatically isolate the affected nodes or segments.

In some illustrative embodiments, if a vendor network is showing a lower entropy, and a predetermined number of nodes, e.g., two or more nodes, in the current enterprise's list are showing an overall lower entropy contribution to the vendor network entropy, then the vendor network may be determined to be in need of isolation to contain any potential threat. Thus, entire vendor networks may be identified as "segments" for isolation and threat containment. Such isolation helps to ensure that threats targeting one vendor network are not able to jump to other vendor networks of the overall system.

In some illustrative embodiments, if a segment is determined as outside of the safe operation band, the nodes are identified for moving to a new sub-segment. Software Defined Networking (SDN) architecture and principles are invoked as defined for the enterprise and a new sub-segment is setup and the nodes are moved to this new sub-segment. Further analysis of the new sub-segment is carried out till the threat perception level falls back to normal. The sub-networks are removed either when the nodes do not operate for some time or sign off from the network.

Thus, the illustrative embodiments provide a decentralized architecture where vendor-specific AI models are trained separately on vendor specific training data, and are used to analyze real-time security information from vendor networks. The illustrative embodiments include fuzzy logic based adaptive segmentation which dynamically segments vendor networks and/or the system in real time based on varying risk levels. The illustrative embodiments provide for machine learning driven monitoring using vendor specific customized AI computer models, which allows for tailoring security measures to specific vendors based on evaluations of vendor network and system entropy. The illustrative embodiments provide for immutable record based auditing, e.g., blockchain based auditing, as all actions, such as segmentation and forensic investigations, are logged immutably to ensure secure, tamper-proof audits. Moreover, the illustrative embodiments promote collaborative threat intelligence sharing with anonymization of threat intelligences among the vendors to ensure vendor proprietary information is not divulged.

The following description provides examples of embodiments of the present disclosure, and variations and substitutions may be made in other embodiments. Several examples will now be provided to further clarify various aspects of the present disclosure.

Example 1: A method for decentralized security orchestration in a data processing system comprising a plurality of vendor networks. The method comprises executing machine learning training, for each vendor network in the plurality of vendor networks, on a corresponding vendor network artificial intelligence (AI) computer model to thereby generate a plurality of trained vendor network AI computer models, wherein the machine learning training is executed with training data collected from a corresponding vendor network over time as input to the corresponding vendor network AI computer model, and wherein the training data represents transactions occurring within the corresponding vendor network. The method also comprises executing the plurality of trained vendor network AI computer models on new security information collected from the plurality of vendor networks of the data processing system, to thereby classify activity in portions of the data processing system as to a security risk level. The method further comprises executing fuzzy logic on the classifications of activity in portions of the data processing system to automatically determine whether segmentation of the data processing system is to be performed or not due to a portion of the data processing system having a predetermined security risk level classification. In addition, the method comprises, in response to the fuzzy logic indicating that segmentation is to be performed, automatically segmenting the data processing system to isolate the portion of the data processing system having the predetermined security risk level classification.

The above limitations advantageously enable security monitoring in a multi-vendor data processing system in which the monitoring may be customized to different vendors providing different vendor networks and corresponding AI computer models. The above limitations advantageously enable automated segmentation and isolation of portions of the multi-vendor data processing system associated with particular levels of security risk so as to avoid lateral movement of potential security threats through the multi-vendor data processing system.

Example 2: The limitations of any of Examples 1 and 3-10, wherein at least two of the vendor networks in the plurality of vendor networks are associated with different vendors and have different vendor network AI computer models and different trained vendor network AI computer models trained on different training data collected from the corresponding different vendor networks. The above limitations advantageously enable security monitoring, segmentation, and isolation in heterogenous multi-vendor networks where a plurality of different vendors provide security monitoring systems with vendor specific AI computer models.

Example 3: The limitations of any of Examples 1-2 and 4-10, further comprising, in response to a determination that segmentation is to be performed with regard to the portion of the data processing system having the predetermined security risk level classification, transmitting security threat data, from a first trained vendor network AI computer model associated with a vendor network corresponding to the portion of the data processing system having the predetermined security risk level classification, to one or more second trained vendor network AI computer models in the plurality of trained vendor network AI computer models. The above limitations advantageously enable collaborative security monitoring across multiple vendors. This improves the training of vendor specific AI computer models for the various vendor networks so as to improve their ability to detect and respond to security threats.

Example 4: The limitations of any of Examples 1-3 and 5-10, wherein the security threat data that is transmitted is anonymized to remove vendor specific information from the security threat data prior to transmission. The above limitations advantageously enable collaborative security monitoring across multiple vendors without divulging vendor proprietary information.

Example 5: The limitations of any of Examples 1-4 and 6-10, further comprising, in response to the fuzzy logic indicating that segmentation is to be performed, automatically generating a new segment of the data processing system and moving the portion of the data processing system having the predetermined security risk level classification to the new segment. The above limitations advantageously enable automatic segmentation of the data processing system so as to prevent spread of a security threat.

Example 6: The limitations of any of Examples 1-5 and 7-10, wherein the portion of the data processing system having the predetermined security risk level classification comprises a network path between two points, a subnetwork containing clusters of related nodes, or an entire vendor network in the plurality of vendor networks. The above limitations advantageously enable the automatic segmentation of a data processing system at various levels in an adaptive manner based on detected security issues.

Example 7: The limitations of any of Examples 1-6 and 8-10, wherein executing the fuzzy logic comprises: computing one or more entropy metrics of the portions of the data processing system, wherein the one or more entropy metrics are a fuzzy logic function of one or more of session activities, suspicious level for activities by endpoints, user privileges, privilege changes within sessions, volume of data, and endpoint network atomicity across all endpoints within the portions of the data processing system; and determining, for each portion of the data processing system, a corresponding security risk level classification for that portion of the data processing system based on the one or more entropy metrics. The above limitations advantageously enable detection of security threats based on an evaluation of the entropy of portions of the data processing system based on various factors. This may advantageously consider single vendor and cross-vendor security threats.

Example 8: The limitations of any of Examples 1-7 and 9-10, wherein determining a corresponding security risk level classification for each portion of the data processing system comprises determining whether the entropy metric associated with that portion of the data processing system increases or decreases over time, wherein a greater decrease in an entropy metric indicates a higher security risk level classification than an increase in an entropy metric or lower decrease in an entropy metric over time. The above limitations advantageously enable security risk classification based on an entropy trend over time indicating whether the entropy of one or more portions of a data processing system are increasing, decreasing, or remaining constant.

Example 9: The limitations of any of Examples 1-8 and 10, wherein each component of the data processing system has a unique and immutable identity on a blockchain, and wherein entries in the blockchain are added based on the new security information to maintain an immutable record of activity in the data processing system. The above limitations advantageously enable auditing of security information in a way that prevents tampering and increases reliability of the security information for auditing purposes.

Example 10: The limitations of any of Examples 1-9, wherein the new security information is real-time security information and wherein the operations of executing the plurality of trained vendor network AI computer models on the new security information, executing the fuzzy logic on the classifications of activity in portions of the data processing system, and automatically segmenting the data processing system to isolate the portion having the predetermined security risk level classification are performed dynamically based on the real-time security information. The above limitations advantageously enable real-time and dynamic segmentation and isolation of portions of a data processing system to help ensure that security threats are not permitted to expand or spread through the data processing system.

Example 11: A system comprising one or more processors and one or more computer-readable storage media collectively storing program instructions which, when executed by the one or more processors, are configured to cause the one or more processors to perform a method according to any one of Examples 1-10.

The above limitations advantageously enable a system comprising one or more processors to perform and realize the advantages described with respect to Examples 1-10.

Example 12: A computer program product comprising one or more computer readable storage media, and program instructions collectively stored on the one or more computer readable storage media, the program instructions comprising instructions configured to cause one or more processors to perform a method according to any one of Examples 1-10. The above limitations advantageously enable a computer program product having program instructions configured to cause one or more processors to perform and realize the advantages described with respect to Examples 1-10.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a decentralized security orchestration platform that comprises a plurality of AI computer models that are trained to identify anomalous operations of vendor networks and leverage these AI computer models to identify potential security vulnerabilities and automatically perform network segmentation to isolate and address such detected threats. The improved computing tool implements mechanism and functionality, such as a Decentralized Security Orchestration Platform (DSOP), which cannot be practically performed by human beings either outside of, or with the assistance of, a technical environment, such as a mental process or the like. The improved computing tool provides a practical application of the methodology at least in that the improved computing tool is able to provide AI based threat identification in open networks having multiple vendor stacks and perform operations to isolate and self-heal affected portions of the network such that the threat is contained and does not spread to other vendor stacks.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as Decentralized Security Orchestration Platform (DSOP) 200. In addition to DSOP 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and DSOP 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in DSOP 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in DSOP 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a DSOP 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates decentralized AI driven security monitoring and segmentation of open networks with multiple vendor stacks in a manner that quickly and efficiently identifies potential threats and isolates those threats so that they will not extend from one vendor stack to another.

With regard to the components of FIG. 1, in accordance with the illustrative embodiments, the server computing device 101 operates to process security data and execute the DSOP 200. The wide area network 102 facilitates the data connections between vendor networks of one or more of the other computing systems and devices 103-106, and the DSOP system 200 executing on server computing device 101. One or more remote servers, e.g., remote server 104, stores and processes security related data and may provide the results of this processing to the DSOP system 200 via the wide area network 102. Each component shown in FIG. 1 may operate to feed data to the DSOP 200 where the AI models analyze data traffic and trigger security responses, such as network segmentation and/or isolation as described herein.

FIG. 2 is an example block diagram illustrating the primary operational components of a Decentralized Security Orchestration Platform (DSOP) in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., indicators of a level of suspicion via a Graphical User Interface (GUI), and the resulting output may aid human beings, e.g., identification of potential security vulnerabilities and isolation of subnetworks in the multiple vendor network in order to contain threats. The invention is specifically directed to the automatically operating computer components directed to improving the way that open networks with multiple vendor stacks are maintained secure and cyber threats are contained, which cannot be practically performed by human beings as a mental process and is not directed to organizing any human activity.

As shown in FIG. 2, the DSOP 200 comprises a vendor network interface 210, analyst interface logic 220, one or more trained vendor network AI computer models 230, a fuzzy logic classification engine 240, adaptive network segmentation engine 250, vendor threat intelligence collaboration engine 260, and blockchain auditing engine 270. The DSOP 200 may be associated with a particular enterprise and may be configured for that particular enterprise such that different fuzzy logic rule sets may be defined for different enterprises in the fuzzy logic classification engine 240. Thus, different instances of the DSOP 200 may be associated with different enterprises, or a single DSOP 200 may have a plurality of configurations for a plurality of different enterprises and may invoke the different configurations when managing the different enterprise computing systems.

Each enterprise may have a computing system that utilizes one or more vendor networks or stacks. The vendor network or stacks are a collection of software, hardware, and services provided by a vendor. Each of these vendor networks or stacks are managed and secured independently from other vendor networks. However, the management and security are also integrated by the DSOP system of the illustrative embodiments to enable a broader monitoring, threat detection, and exchange of machine learning insights with regard to suspicious activities and corresponding responses.

The computing system, and each vendor network, may have monitoring agents that monitor the activity of the various systems/networks and report security information back to the DSOP 200. The security information may include, for example, payloads, frequency, role privileges, packet size factors, URL, and the like. The security information may be obtained from the monitoring agents 280 associated with the various vendor networks 290 via one or more data networks 275 and the vendor network interface 210. The security information obtained from the various vendor networks 290 is processed via corresponding trained AI computer models in the one or more trained vendor network AI computer models 230.

That is, the one or more trained vendor network AI computer models 230 are trained on training data from a corresponding vendor network, to classify security information into bands, or classifications, of risk with regard to security vulnerabilities or compromises. Each vendor network has a corresponding AI computer model in the one or more trained vendor network AI computer models 230 that is specifically trained for that particular vendor network and thus, is customized to that vendor network. The AI computer model for a vendor network 290 analyzes the security information reported by the monitoring agent 280 of that vendor network 290 which may include network traffic, device behavior, and user activity information that may be indicative of potential security vulnerabilities or compromises. This can be done on a continuous basis so as to detect and respond to emerging threats rapidly.

When a new vendor network is to be added to the enterprise's computing system, the traffic, devices and user activities, are measured, if not already available, for a period of time to build a training data set. A human security analyst may manually label the collected security information as to whether it represents a particular classification of risk, and thereby provide a ground truth for the training data set. The training data set is used to train a corresponding machine learning computer model, or AI computer model, in the AI computer models 230 for the new vendor network. In this way, the new vendor network is associated with its own custom trained AI computer model that is trained to classify input features as to whether the features represent normal or abnormal operations of the vendor network in terms of predefined bands or classes of risk. Thus, there may be a separate custom trained AI computer model for each vendor network 290 in the one or more trained vendor network AI computer models 230.

The one or more trained vendor network AI computer models 230 may further include one or more AI computer models that operate to combine or evaluate patterns of a plurality of the vendor networks so as to identify potential security vulnerabilities or threats that may span multiple vendor networks. That is, one or more combinatorial machine learning computer models may be provided that operate on input features from different vendor networks to look for patterns and compute likely anomalies in the combination of vendor networks. The one or more combinatorial machine learning computer models may take inputs from the outputs of the various trained vendor network AI computer models 230 for all, or a portion of, the vendor networks involved in the enterprise's computing system, such as in an ensemble type approach, to thereby generate a combined classification of whether the enterprise's computing system, or portion of the system, is likely the target of a security threat or poses a threat vulnerability.

Once trained, given security information collected via the monitoring agents 280 and reported to the DSOP 200 via the vendor network interface 210, the one or more trained vendor network AI computer models 230 classify the various input features extracted from the security information to determine where, in bands or predetermined classifications of level of risk or security, the pattern of input features fall with regard to indicating a potential security vulnerability or compromise. The one or more vendor AI computer models 230 may also receive human analyst specified security information via the analyst interface logic 220. The analyst interface logic 220 may provide one or more user interfaces, e.g., GUIs, through which one or more analysts monitoring the enterprise computing system, individual vendor networks, or the like, may identify potential security issues. For example, through a GUI mechanism, such as a slider bar or the like, the security analyst may specify that a particular pattern of security information for a particular given time period is representative of a particular level of security risk in the opinion of the particular analyst. This information may be utilized as input along with the other security information that is automatically collected to the one or more trained vendor network AI computer models 230 which may generate classifications of the activity occurring in the vendor networks, and across vendor networks, with regard to potential security vulnerabilities or compromises.

The outputs of the vendor network AI computer models 230 are provided as input to the fuzzy logic classification engine 240, which operates to determine whether a segmentation and isolation of a part of the enterprise computing system is warranted. The fuzzy logic classification engine 240 is specifically configured with fuzzy logic rules for the particular enterprise which reflect the relative importance of different vendor network classifications, different security information based parameters, and the like, so as to generated weightings of the various factors with regard to determining whether to perform segmentation and isolation of portions of the enterprise computing system. The fuzzy logic rules operate on fuzzy metrics which may be defined by the enterprise for evaluating active network level operations, subnetwork level operations, and node level operations. The set of fuzzy logic rules and fuzzy metrics may operate on the concept of vendor network/sub-network entropy and classification of this entropy. This vendor network/sub-network entropy is a disorder measure which may be calculated and classified into various entropy bands.

This classification of network/sub-network entropy may then be used to determine when active network segmentation needs to be carried out and when sub-network topologies need to be moved to implement network isolation regions. Again, as an example, if it is observed that the network/sub-network entropy of a portion of an enterprise's computing system is constant or decreasing over time, this can be taken as an indicator that there is a potential security vulnerability and automated active network segmentation may be performed to isolate corresponding segments of the system, thereby decreasing the likelihood that any such security vulnerability or security breach can spread to other components, such as other components of the same or different vendor stacks.

In some illustrative embodiments, the fuzzy logic rules implemented by the fuzzy logic classification engine 240 may be implemented as conditional statements that evaluate network parameters to assess risk. For example, a fuzzy logic rule may be of the type "If packet size is large and transaction frequency is high, then classify as high-risk". These fuzzy logic rules are evaluated by the fuzzy logic classification engine 240 using real-time data. The fuzzy logic classification engine 240 assigns weightings to different factors, creating a composite score that determines whether the DSOP 200 should trigger segmentation and/or isolation. It should be appreciated that a different set of fuzzy logic rules may be established for different vendors, where the differences may be in the particular factors evaluated, the particular weightings applied, and/or the particular collection of rules defined for each vendor.

The DSOP 200 includes the adaptive network segmentation engine 250 which implements adaptive network segmentation logic that automatically adjusts the level of segmentation based on real-time security intelligence and network activity information collected by the monitoring agents 280 for the various vendor networks 290 on a continuous basis. That is, if suspicious behavior or anomalies are detected via the analysis and classification of the security information and analyst provided information by the one or more trained vendor network AI computer models 230 and fuzzy logic classification engine 240, the adaptive network segmentation engine 250 is invoked by the DSOP 200 to dynamically isolate the affected components from the rest of the enterprise computing system, thereby isolating and containing potential threats quickly. The adaptive network segmentation engine 250 uses the fuzzy logic classification engine 240 to auto-generate the decision if segmentation is to be carried out. The auto-generation of such decisions by the fuzzy logic classification engine 240 reduces delays in the network segmentation and reconfiguration to isolate the impacted systems, but still provides service at low latency, i.e., perceptible but not user impacting.

The fuzzy rule set implemented by the fuzzy logic classification engine 240 may operate to determine if the entropy of the enterprise computing system, vendor networks, or even sub-networks, is temporally increasing over time. If the entropy is constant or decreasing, this can be taken as the signal to isolate and create isolated segments. In response to detection of constant or decreasing entropy over time, the adaptive network segmentation engine 250 may be automatically invoked to perform automatic segmentation to isolate the affected components of the enterprise computing system, vendor network, or sub-network. In performing the network segmentation, the adaptive network segmentation engine 250 generates a new, isolated, segment in the computing system and moves the affected components to the new, isolated segment.

Once the affected components are in the new isolated segment, the adaptive network segmentation engine 250 may initiate forensic investigations, and apply predefined remediation steps. The forensic and remediation operations may leverage existing techniques but are integrated into an automated, AI driven system, i.e., the DSOP 200. After a segment is isolated, the DSOP 200 performs forensic analysis, which may include analysis of the blockchain, from the instantiation of the session. The analysis may look at temporal packet size averages, known average session duration, privilege level changes, and the like. The analysis traces the root of a security anomaly or threat, while automated remediation operations restore compromised nodes to their last known secure state, which may involve reducing a privilege of the node, requiring reauthentication, or performing session termination. Thus, the DSOP 200 may implement a self-healing architecture where compromised components are automatically quarantined as noted above, and once quarantined, may be restored to a known secure state.

The DSOP 200 further includes the vendor threat intelligence collaboration engine 260 which operates to facilitate collaboration among different vendor networks or stacks by facilitating a secure and anonymized threat intelligence sharing mechanism. Vendors can share insights into the latest threats and vulnerabilities without revealing proprietary information, allowing the entire ecosystem to benefit from collective security knowledge. This information may be collected and maintained by the vendor threat intelligence collaboration engine 260 and provided as further inputs for configuring the fuzzy logic classification engine 240 for evaluating the classifications generated by the trained vendor network AI computer models 230. Moreover, in some cases, this information may be used as further training data for refining the training of one or more of the trained vendor network AI computer models 230, e.g., a vendor may provide threat intelligence information which may then be used to fine tune operational parameters of that vendor's trained vendor network AI computer model 230. It should be appreciated that the threat intelligence information that is shared between vendor network AI computer models 230 may be anonymized by parsing and removing/replacing any portions of the threat intelligence information determined to be vendor sensitive or proprietary, using anonymization techniques and logic generally known in the art, so as to not divulge any vendor proprietary information from one vendor to the other.

The blockchain auditing engine 270 utilizes blockchain technology to establish a secure and tamper-proof identity and access management system. Each network component, including vendor stacks, is assigned a unique and immutable identity on the blockchain. Access controls and permissions are cryptographically enforced, preventing unauthorized access and potential privilege escalations. Thus, when the security information is collected by the monitoring agents 280, a blockchain auditing record of the network components, vendor stacks, and the like are used for the activities being performed and monitored in each vendor network 290. If a security vulnerability or compromise is determined to have occurred by the other elements of the DSOP 200, and an audit of the security vulnerability or compromise is to be performed, this blockchain information may be utilized by the blockchain auditing engine 270 to determine the potential sources of the security vulnerability or compromise. Thus, security audits are conducted through blockchain-based smart contracts, generating immutable records of all security-related activities. These transparent audits enable stakeholders to validate the effectiveness of security measures and ensure compliance with industry standards.

Thus, as noted previously, the DSOP mechanisms of the illustrative embodiments significantly reduces the system's attack surface, preventing lateral movement and containing threats more effectively, reducing the risk of system compromise. The use of AI-driven monitoring allows for rapid detection and response to emerging threats via autonomous and continuous monitoring, bolstering the system's ability to fend off sophisticated attacks. The DSOP mechanisms foster a collaborative security ecosystem where vendors work together to improve overall security without compromising proprietary information. Transparent security audits through blockchain ensure accountability and instill confidence in stakeholders, regulators, and customers. This is further bolstered by the conducting of periodic security assessments and audits of the entire network and vendor stacks to proactively identify vulnerabilities and weaknesses. The DSOP mechanisms implement a self-healing architecture where compromised components are automatically quarantined and restored to a known secure state after quarantine.

Figure 3:
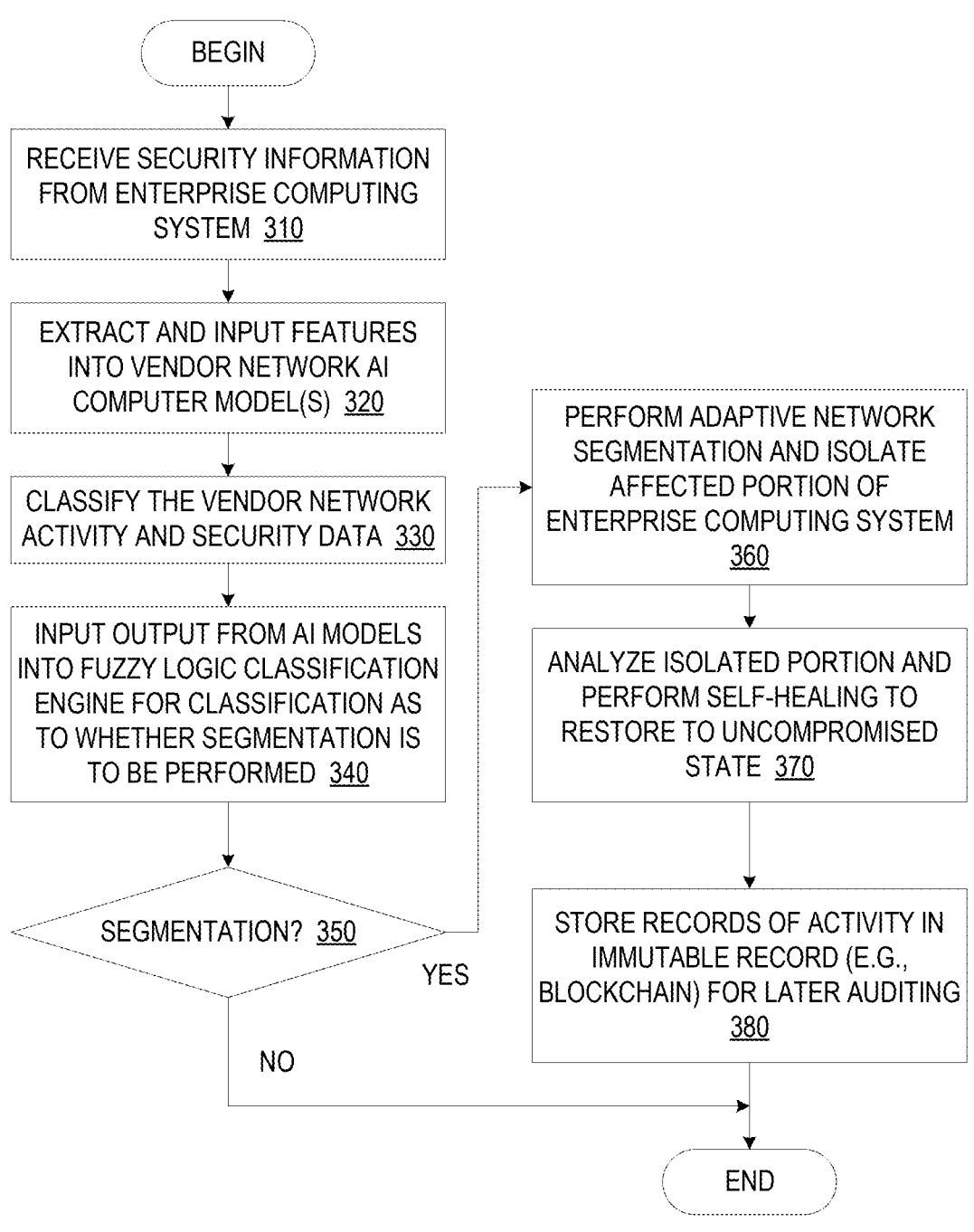
FIG. 3 is a flowchart outlining an example operation for performing automated adaptive network segmentation in accordance with one illustrative embodiment.

FIG. 3 presents a flowchart outlining an example operations of elements of the present invention with regard to one or more illustrative embodiments. It should be appreciated that the operations outlined in FIG. 3 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 3, and may, in some cases, make use of the results generated as a consequence of the operations set forth in FIG. 3, the operations in FIG. 3 themselves are specifically performed by the improved computing tool in an automated manner.

FIG. 3 is a flowchart outlining an example operation for performing automated adaptive network segmentation in accordance with one illustrative embodiment. The operation of FIG. 3 assumes that the one or more vendor network AI computer models have been trained based on vendor network specific training data captured over time when the vendor network is added to the enterprise computing system. Thus, FIG. 3 does not include the operations involved in training these vendor network specific AI computer models but instead is directed to the runtime operation after training has been performed.

As shown in FIG. 3, the operation starts by receiving security information from an enterprise computing system via one or more monitoring agents associated with one or more vendor networks of the enterprise computing system (step 310). The security information is processed to extract input features that are input to corresponding ones of the vendor network AI computer models for each of the vendor networks from which security information is obtained (step 320). The vendor network AI computer models classify the vendor network activity and security data present in the features extracted from the security information to determine a band or predefined classification of these features (step 330). The outputs of the various one or more vendor network AI computer models are input to the enterprise configured fuzzy logic classification engine for classification as to whether segmentation and isolation of a portion of the enterprise computing system is warranted (step 340). If segmentation is to be performed (step 350: YES), then an adaptive network segmentation engine is invoked to segment and isolate the affected portion of the enterprise computing system (step 360). Once isolated, the affected portion may be analyzed using forensic analysis and a self-healing may be implemented to restore the portion of the enterprise computing system to a prior uncompromised state (step 370). Thereafter, or If segmentation is not to be performed (step 350: NO), the operation stores one or more records of the activity, e.g., transactions, using a blockchain smart contract mechanism for later review and auditing and the operation terminates (step 380).

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for decentralized security orchestration in a data processing system comprising a plurality of vendor networks, the method comprising:

executing machine learning training, for each vendor network in the plurality of vendor networks, on a corresponding vendor network artificial intelligence (AI) computer model to thereby generate a plurality of trained vendor network AI computer models, wherein the machine learning training is executed with training data collected from a corresponding vendor network over time as input to the corresponding vendor network AI computer model, and wherein the training data represents transactions occurring within the corresponding vendor network;

executing the plurality of trained vendor network AI computer models on new security information collected from the plurality of vendor networks of the data processing system, to thereby classify activity in portions of the data processing system as to a security risk level;

executing fuzzy logic on the classifications of activity in portions of the data processing system to automatically determine whether segmentation of the data processing system is to be performed or not due to a portion of the data processing system having a predetermined security risk level classification; and in response to the fuzzy logic indicating that segmentation is to be performed, automatically segmenting the data processing system to isolate the portion of the data processing system having the predetermined security risk level classification.

2. The method of claim 1, wherein at least two of the vendor networks in the plurality of vendor networks are associated with different vendors and have different vendor network AI computer models and different trained vendor network AI computer models trained on different training data collected from the corresponding different vendor networks.

3. The method of claim 1, further comprising, in response to a determination that segmentation is to be performed with regard to the portion of the data processing system having the predetermined security risk level classification, transmitting security threat data, from a first trained vendor network AI computer model associated with a vendor network corresponding to the portion of the data processing system having the predetermined security risk level classification, to one or more second trained vendor network AI computer models in the plurality of trained vendor network AI computer models.

4. The method of claim 3, wherein the security threat data that is transmitted is anonymized to remove vendor specific information from the security threat data prior to transmission.

5. The method of claim 1, further comprising, in response to the fuzzy logic indicating that segmentation is to be performed, automatically generating a new segment of the data processing system and moving the portion of the data processing system having the predetermined security risk level classification to the new segment.

6. The method of claim 5, wherein the portion of the data processing system having the predetermined security risk level classification comprises a network path between two points, a subnetwork containing clusters of related nodes, or an entire vendor network in the plurality of vendor networks.

7. The method of claim 1, wherein executing the fuzzy logic comprises:

computing one or more entropy metrics of the portions of the data processing system, wherein the one or more entropy metrics are a fuzzy logic function of one or more of session activities, suspicious level for activities by endpoints, user privileges, privilege changes within sessions, volume of data, and endpoint network atomicity across all endpoints within the portions of the data processing system; and determining, for each portion of the data processing system, a corresponding security risk level classification for that portion of the data processing system based on the one or more entropy metrics.

8. The method of claim 7, wherein determining a corresponding security risk level classification for each portion of the data processing system comprises determining whether the entropy metric associated with that portion of the data processing system increases or decreases over time, wherein a greater decrease in an entropy metric indicates a higher security risk level classification than an increase in an entropy metric or lower decrease in an entropy metric over time.

9. The method of claim 1, wherein each component of the data processing system has a unique and immutable identity on a blockchain, and wherein entries in the blockchain are added based on the new security information to maintain an immutable record of activity in the data processing system.

10. The method of claim 1, wherein the new security information is real-time security information and wherein the operations of executing the plurality of trained vendor network AI computer models on the new security information, executing the fuzzy logic on the classifications of activity in portions of the data processing system, and automatically segmenting the data processing system to isolate the portion having the predetermined security risk level classification are performed dynamically based on the real-time security information.

11. A computer program product comprising a computer readable storage medium having a computer readable program stored therein, wherein the computer readable program, when executed in a data processing system, causes the data processing system to:

execute machine learning training, for each vendor network in the plurality of vendor networks, on a corresponding vendor network artificial intelligence (AI) computer model to thereby generate a plurality of trained vendor network AI computer models, wherein the machine learning training is executed with training data collected from a corresponding vendor network over time as input to the corresponding vendor network AI computer model, and wherein the training data represents transactions occurring within the corresponding vendor network;

execute the plurality of trained vendor network AI computer models on new security information collected from the plurality of vendor networks of the data processing system, to thereby classify activity in portions of the data processing system as to a security risk level;

execute fuzzy logic on the classifications of activity in portions of the data processing system to automatically determine whether segmentation of the data processing system is to be performed or not due to a portion of the data processing system having a predetermined security risk level classification; and in response to the fuzzy logic indicating that segmentation is to be performed, automatically segment the data processing system to isolate the portion of the data processing system having the predetermined security risk level classification.

12. The computer program product of claim 11, wherein at least two of the vendor networks in the plurality of vendor networks are associated with different vendors and have different vendor network AI computer models and different trained vendor network AI computer models trained on different training data collected from the corresponding different vendor networks.

13. The computer program product of claim 11, wherein the computer readable program further causes the data processing system to transmit, in response to a determination that segmentation is to be performed with regard to the portion of the data processing system having the predetermined security risk level classification, security threat data, from a first trained vendor network AI computer model associated with a vendor network corresponding to the portion of the data processing system having the predetermined security risk level classification, to one or more second trained vendor network AI computer models in the plurality of trained vendor network AI computer models.

14. The computer program product of claim 13, wherein the security threat data that is transmitted is anonymized to remove vendor specific information from the security threat data prior to transmission.

15. The computer program product of claim 11, wherein the computer readable program further causes the data processing system to automatically generate, in response to the fuzzy logic indicating that segmentation is to be performed, a new segment of the data processing system and moving the portion of the data processing system having the predetermined security risk level classification to the new segment.

16. The computer program product of claim 15, wherein the portion of the data processing system having the predetermined security risk level classification comprises a network path between two points, a subnetwork containing clusters of related nodes, or an entire vendor network in the plurality of vendor networks.

17. The computer program product of claim 11, wherein the computer readable program further causes the data processing system to execute the fuzzy logic at least by:

computing one or more entropy metrics of the portions of the data processing system, wherein the one or more entropy metrics are a fuzzy logic function of one or more of session activities, suspicious level for activities by endpoints, user privileges, privilege changes within sessions, volume of data, and endpoint network atomicity across all endpoints within the portions of the data processing system; and determining, for each portion of the data processing system, a corresponding security risk level classification for that portion of the data processing system based on the one or more entropy metrics.

18. The computer program product of claim 17, wherein determining a corresponding security risk level classification for each portion of the data processing system comprises determining whether entropy metric associated with that portion of the data processing system increases or decreases over time, wherein a greater decrease in an entropy metric indicates a higher security risk level classification than an increase in an entropy metric or lower decrease in an entropy metric over time.

19. The computer program product of claim 11, wherein each component of the data processing system has a unique and immutable identity on a blockchain, and wherein entries in the blockchain are added based on the new security information to maintain an immutable record of activity in the data processing system.

20. An apparatus comprising:

at least one processor; and at least one memory coupled to the at least one processor, wherein the at least one memory comprises instructions which, when executed by the at least one processor, cause the at least one processor to:

execute machine learning training, for each vendor network in the plurality of vendor networks, on a corresponding vendor network artificial intelligence (AI) computer model to thereby generate a plurality of trained vendor network AI computer models, wherein the machine learning training is executed with training data collected from a corresponding vendor network over time as input to the corresponding vendor network AI computer model, and wherein the training data represents transactions occurring within the corresponding vendor network;

execute the plurality of trained vendor network AI computer models on new security information collected from the plurality of vendor networks of the data processing system, to thereby classify activity in portions of the data processing system as to a security risk level;

execute fuzzy logic on the classifications of activity in portions of the data processing system to automatically determine whether segmentation of the data processing system is to be performed or not due to a portion of the data processing system having a predetermined security risk level classification; and in response to the fuzzy logic indicating that segmentation is to be performed, automatically segment the data processing system to isolate the portion of the data processing system having the predetermined security risk level classification.

\* \* \* \* \*